(12) United States Patent
Mott et al.

(10) Patent No.: US 7,761,636 B2
(45) Date of Patent: Jul. 20, 2010

(54) METHOD AND SYSTEM FOR PROVIDING ACCESS ARBITRATION FOR AN INTEGRATED CIRCUIT IN A WIRELESS DEVICE

(75) Inventors: Jordan C. Mott, Allen, TX (US); William M. Hurley, Murphy, TX (US); Avery C. Topps, Austin, TX (US); J. Alexander Interrante, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 842 days.

(21) Appl. No.: 11/603,916

(22) Filed: Nov. 22, 2006

(65) Prior Publication Data
US 2008/0120450 A1    May 22, 2008

(51) Int. Cl.
 G06F 12/00 (2006.01)
 G06F 3/00 (2006.01)
 G06F 9/46 (2006.01)

(52) U.S. Cl. .................... 710/240; 710/244; 710/6; 718/107; 718/108; 718/103; 370/395.4; 712/228

(58) Field of Classification Search ............... 710/6; 718/103; 370/395.4
See application file for complete search history.

(56) References Cited

U.S. PATENT DOCUMENTS

| | | | |
|---|---|---|---|
| 6,175,880 B1 * | 1/2001 | Hsu et al. ................ | 710/5 |
| 6,877,052 B1 * | 4/2005 | Osborne ................. | 710/107 |
| 2006/0031618 A1 * | 2/2006 | Hansquine et al. ...... | 710/305 |
| 2007/0191007 A1 * | 8/2007 | Hayek et al. ........... | 455/435.2 |
| 2008/0005366 A1 * | 1/2008 | Raatni et al. .......... | 710/8 |

* cited by examiner

*Primary Examiner*—Mark Rinehart
*Assistant Examiner*—Brian T Misiura (57) ABSTRACT

A method for providing access arbitration for an integrated circuit in a wireless device is provided. The method includes receiving a command from a processing element coupled to the integrated circuit. A preempt signal associated with the command is generated. The preempt signal is operable to identify a priority for the command as one of high and low. The preempt signal is provided to an access arbiter for use in providing access arbitration for the command.

20 Claims, 7 Drawing Sheets

METHOD AND SYSTEM FOR PROVIDING ACCESS ARBITRATION FOR AN INTEGRATED CIRCUIT IN A WIRELESS DEVICE

TECHNICAL FIELD OF THE INVENTION

The present invention relates generally to wireless communication and, more specifically, to a method and system for providing access arbitration for an integrated circuit in a wireless device.

BACKGROUND OF THE INVENTION

Conventional mobile stations in wireless networks include a radio frequency integrated circuit (RFIC), along with at least one modem that communicates with the RFIC. Some mobile stations have a multi-standard RFIC that may communicate with multiple modems, each assigned to a different air interface standard. For mobile stations of this type, it is possible that multiple modems may request write and/or read access from the RFIC at the same time. Thus, the RFIC usually provides some type of access arbitration in order to handle these requests.

Typical access arbitration techniques include a first in/first out (FIFO) method, a round robin method, and different priorities assigned to different ports. For FIFO implementations, access requests are granted in the order in which they are received. For round robin, each port may be given access once during each of a plurality of continuously repeated cycles. For priority-assigned ports, access requests are granted based on a pre-assigned priority for the requesting port. Thus, a high-priority port is always given access prior to a low-priority port.

However, these methods may result in a port having to wait too long for a response in some circumstances. For example, after a read request, the RFIC must respond within a specified period of time during which the requesting modem expects the read response. If the RFIC fails to respond within this specified period of time, an invalid read may occur. Thus, using FIFO or round robin may result in invalid reads due to a requesting port having to wait in line behind ports with lower priority requests. Using assigned priorities does not solve this problem, either, as a higher priority port may starve out a lower priority port, which can result in invalid reads for the lower priority port. Therefore, there is a need in the art for an improved method of providing access-based arbitration when multiple modems are requesting access to a single RFIC in a mobile station.

SUMMARY OF THE INVENTION

A method for providing access arbitration for an integrated circuit in a wireless device is provided. According to an advantageous embodiment of the present disclosure, the method includes receiving a command from a processing element coupled to the integrated circuit. A preempt signal associated with the command is generated. The preempt signal is operable to identify a priority for the command as one of high and low. The preempt signal is provided to an access arbiter for use in providing access arbitration for the command.

According to another embodiment of the present disclosure, a wireless device having an integrated circuit capable of providing access arbitration is provided. The wireless device includes a plurality of processing elements and an RFIC. Each processing element is operable to generate a plurality of commands.

The RFIC is coupled to the processing elements and is operable to receive the commands from the processing elements, to determine a priority for each of the commands based on a priority indicator in the command, and to provide access arbitration based on the priority for each of the commands.

According to yet another embodiment of the present disclosure, an RFIC capable of providing access arbitration in a wireless device is provided that includes a plurality of serial interface blocks and an access arbiter. Each serial interface block is operable to receive commands from a corresponding processing element coupled to the RFIC and to generate a preempt signal for each received command. The access arbiter is coupled to the serial interface blocks. The access arbiter is operable to receive the commands and the corresponding preempt signals from the serial interface blocks, to determine a priority for each of the commands based on the corresponding preempt signal, and to provide access arbitration for the processing elements based on the priority for each of the commands.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless device.

Figure 1:
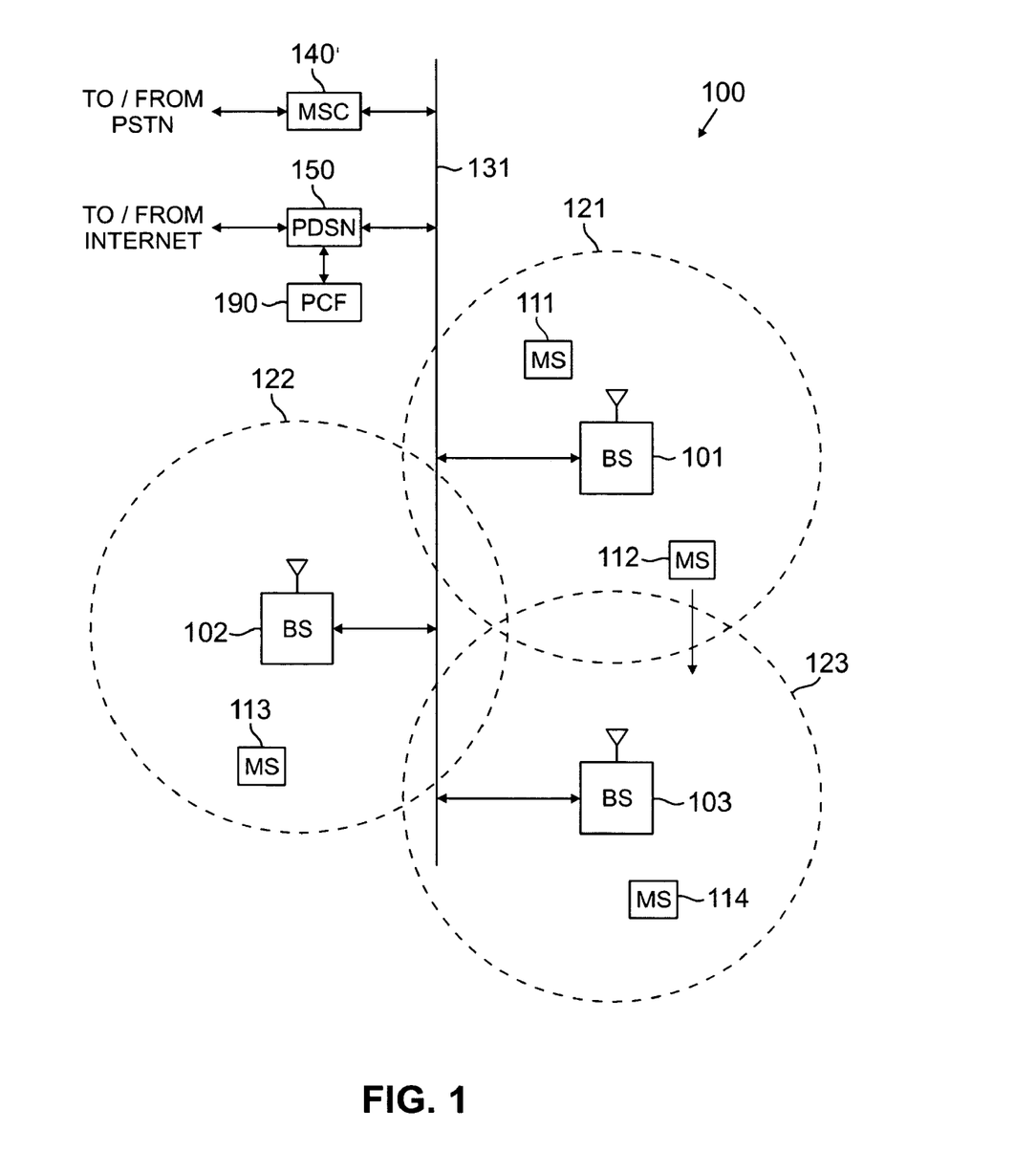
FIG. 1 illustrates a wireless network including wireless devices capable of providing access arbitration for integrated circuits in the wireless devices according to one embodiment of the disclosure.

FIG. 1 illustrates a wireless network 100 that may include base stations and/or mobile stations having integrated circuits for which access arbitration may be provided according to the principles of the present disclosure. Wireless network 100 comprises a plurality of cells (or cell sites) 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

In accordance with one embodiment of the present disclosure, one or more of base stations 101-103 and/or one or more of mobile stations 111-114 comprises an integrated circuit operable to provide access arbitration for a plurality of processing elements based on a priority for each command received from those processing elements. For example, for one embodiment, the integrated circuit is operable to generate a preempt signal for each command that identifies the command as high priority or low priority. High-priority commands may then be placed in a command queue earlier than they would be during normal processing. Thus, high-priority commands are given preferential treatment in processing order, ensuring that those commands are handled promptly.

Figure 2:
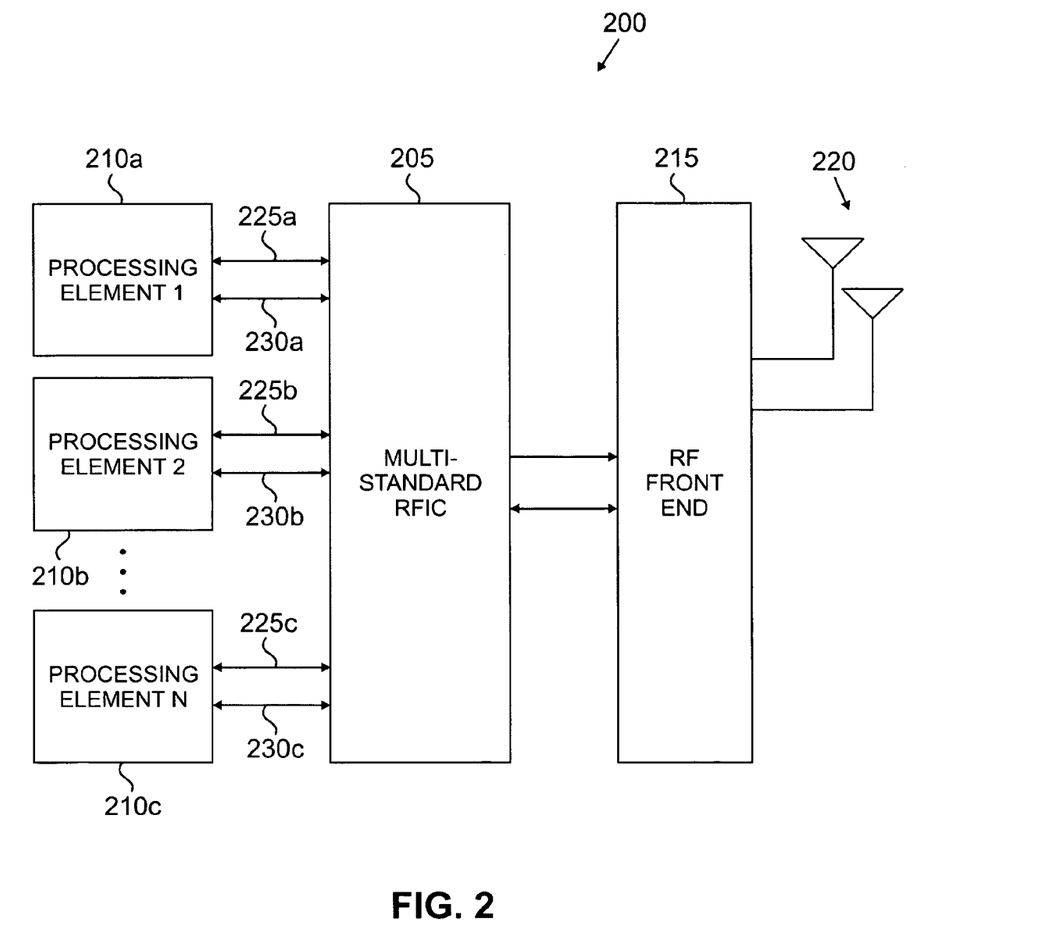
FIG. 2 is a block diagram of a multi-standard wireless device having an integrated circuit capable of providing access arbitration for a plurality of processing elements according to one embodiment of the disclosure.

FIG. 2 is a block diagram of a multi-standard wireless device 200 having an RFIC 205 capable of providing access arbitration for a plurality of processing elements 210 according to one embodiment of the disclosure. For one embodiment, wireless device 200 may comprise a mobile station, such as one of mobile stations 111-114. For other embodiments, wireless device 200 may comprise any other suitable device capable of multi-standard wireless communication.

In addition to RFIC 205 and processing elements 210, wireless device 200 comprises a radio frequency (RF) front end 215 and antennas 220. It will be understood that wireless device 200 may comprise any other suitable components not illustrated in FIG. 2. For example, for the embodiment in which wireless device 200 comprises a mobile station, wireless device 200 may also comprise transmit and receive processing circuitry, a processor, a memory, an input/output interface, a keypad, a display, a microphone, a speaker and/or the like.

Multi-standard RFIC 205 is operable to terminate multiple communication standards, such as CDMA, WCDMA, GSM, WiMax and/or the like. As such, RFIC 205 is operable to perform up-conversion, down-conversion, and filtering differently for each of the different communication standards. Thus, signals received from antennas 220 through RF front end 215 at RFIC 205 may be down-converted and filtered by RFIC 205 such that the signals may be processed by one of the processing elements 210 in accordance with the standard used by that processing element 210. In addition, signals generated using different standards by each of the processing elements 210 may be up-converted and filtered based on those standards by RFIC 205 for processing by RF front end 215 and transmission over antennas 220.

For one embodiment of wireless device 200, processing elements 210 may comprise modems, with each modem configured to meet the requirements of a specific communication standard. Although the wireless device 200 of FIG. 2 explicitly shows three processing elements 210a-c, it will be understood that wireless device 200 may have any suitable number of processing elements 210 without departing from the scope of the present disclosure.

RFIC 205 is operable to communicate with each processing element 210 over a serial interface 225 and a baseband interface 230. Each processing element 210 is operable to control RFIC 205 and RF front end 215 through the corresponding serial interface 225. Because RFIC 205 is designed to meet the requirements of each processing element 210, configuration elements within RFIC 205 may be shared between processing elements 210. A processing element 210 is operable to control the configuration elements through the use of serial read and write operations performed over the serial interface 225. Thus, each serial interface 225 is operable to provide commands, such as read and write commands, from the corresponding processing element 210 to RFIC 205.

Each baseband interface 230 is operable to provide down-converted data from RFIC 205 to the corresponding processing element 210 and to provide data from the processing element 210 to RFIC 205 for up-conversion.

In accordance with one embodiment of the present disclosure, as described in more detail below, RFIC 205 is operable to generate a preempt signal for each command received over a serial interface 225 based on the priority of the command. For high-priority commands, the preempt signal is operable to request preferential treatment for the command in access arbitration provided by RFIC 205.

Figure 3:
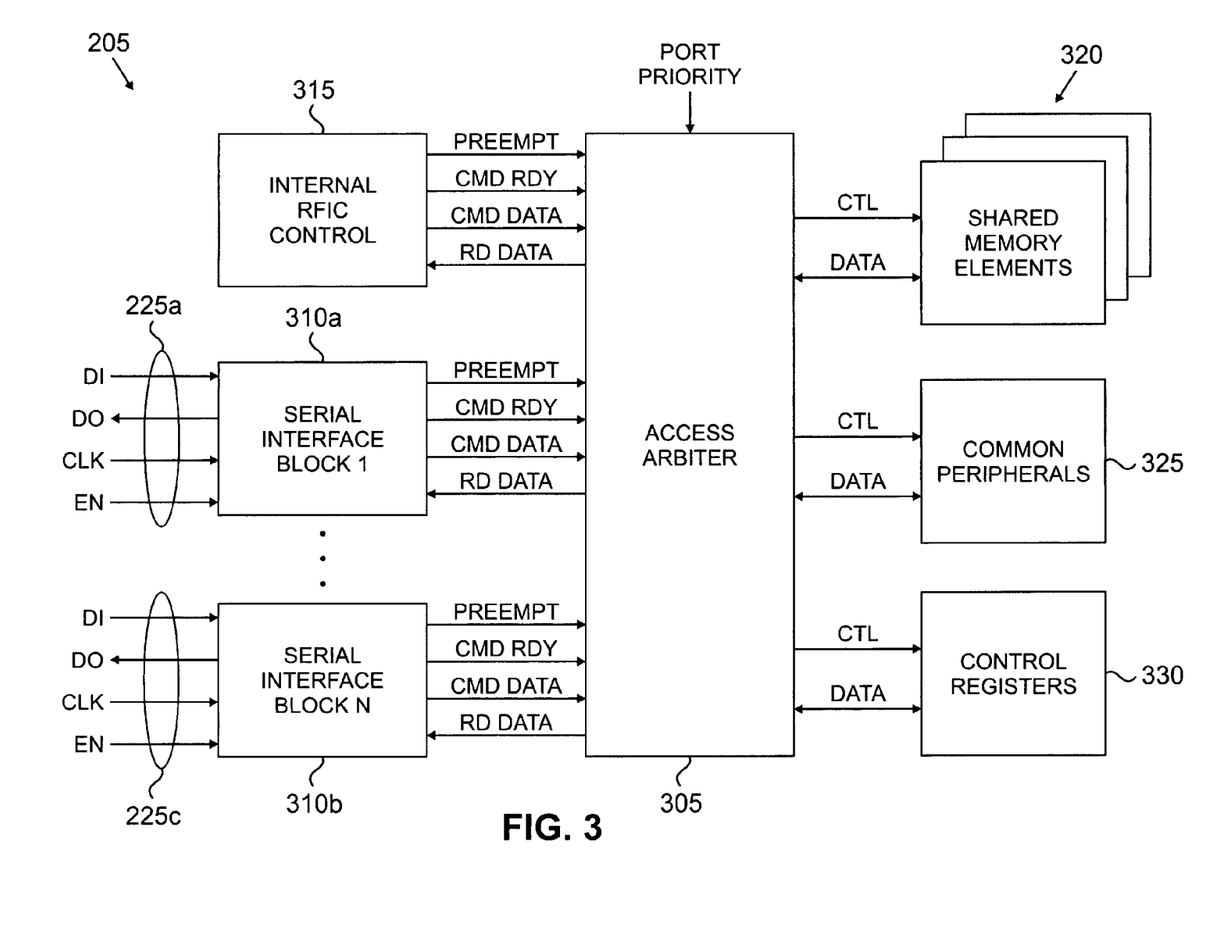
FIG. 3 is a block diagram illustrating details of the multi-standard RFIC of FIG. 2 according to one embodiment of the disclosure.

FIG. 3 is a block diagram illustrating the control interface details of RFIC 205 according to one embodiment of the disclosure. For this embodiment, RFIC 205 comprises an access arbiter 305, a plurality of serial interface blocks 310, an internal RFIC control block 315, shared memory elements 320, common peripherals 325, and control registers 330. It will be understood that RFIC 205 may comprise other or additional components without departing from the scope of the present disclosure.

Each serial interface block 310 is operable to receive signals from and transmit signals to a corresponding processing element 210 over a serial interface 225. Thus, although the RFIC control interface details of FIG. 3 explicitly show two serial interface blocks 310a-b, it will be understood that RFIC 205 may have any suitable number of serial interface blocks 310 based on the number of corresponding processing elements 210 coupled to RFIC 205.

As illustrated in FIG. 3, each serial interface block 310 may be operable to receive a Data In (DI) signal, a clock (CLK) signal, and an enable (EN) signal and to transmit a Data Out (DO) signal from a corresponding processing element 210. For one embodiment, the DI signal may comprise a plurality of words, with each word comprising a command. Each command may comprise a command identifier, an address and optional data. For a particular embodiment, each serial word of the DI signal may be formatted as follows:

| 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| CI | A14 | A13 | A12 | A11 | A10 | A9 | A8 | A7 | A6 | A5 | A4 | A3 | A2 | A1 | A0 | D7 | D6 | D5 | D4 | D3 | D2 | D1 | D0 |

For this embodiment, the most significant bit comprises a command identifier bit, which may be a 0 for write or a 1 for read (or vice versa), the next fifteen bits comprise an address, and the final eight bits may comprise data for write commands. It will be understood that the commands may be otherwise suitably formatted without departing from the scope of the disclosure.

Each serial interface block 310, as well as internal RFIC control block 315, is operable to receive signals from and transmit signals to access arbiter 305. For example, as illustrated in FIG. 3, serial interface blocks 310 and internal RFIC control block 315 may be operable to transmit a preempt signal, a command ready (CMD RDY) signal, and a command data (CMD DATA) signal and to receive a read data (RD DATA) signal. When the preempt signal indicates the command is high priority, the component 310 or 315 transmitting the signal is requesting preferential treatment from access arbiter 305 with respect to the corresponding command. For a particular embodiment, the preempt signal indicates that the requested command is a high-priority command when the command is a read command. For this embodiment, the read command may be considered high priority because of the time constraint associated with the read response expected at the component 310 or 315 that requested the read.

Access arbiter 305 is operable to provide access arbitration for the RFIC control interface based on the preempt signals that may be received from serial interface blocks 310 and/or internal RFIC control block 315. For one embodiment, access arbiter 305 is also operable to provide access arbitration based on a port priority signal received from RFIC 205 that prioritizes the ports for serial interface blocks 310 and/or RFIC control block 315. Access arbiter 305 is operable to respond to requests from serial interface blocks 310 and internal RFIC control 315 by providing access to shared memory elements 320, common peripherals 325, control registers 330 and/or any other suitable elements not illustrated in FIG. 3.

In operation, according to one embodiment, any one or more of serial interface blocks 310 and internal RFIC control 315 may send a preempt signal to access arbiter 305, along with a corresponding command, based on data received from a processing element 210 over a serial interface 225 (or based on internal data in the case of internal RFIC control 315). The preempt signal identifies the corresponding command as a high-priority command or a low-priority command.

Access arbiter 305 then places a marker for each high-priority command in a command queue when the preempt signal is received instead of waiting until a larger portion of the command is received. For low-priority commands, access arbiter 305 places a marker in the command queue in accordance with normal processing procedures. For example, for a write command, the marker would be placed in the command queue after the entire command, including write data, is received. This results in markers for the high-priority commands being placed in the command queue ahead of markers for low-priority commands received at about the same time. Access arbiter 305 then processes the requests based on the order of the markers in the command queue. If two or more of serial interface blocks 310 and internal RFIC control 315 send a high-priority preempt signal to access arbiter 305, access arbiter 305 may choose an order for the markers corresponding to these commands based on the port priority signal.

Figure 4:
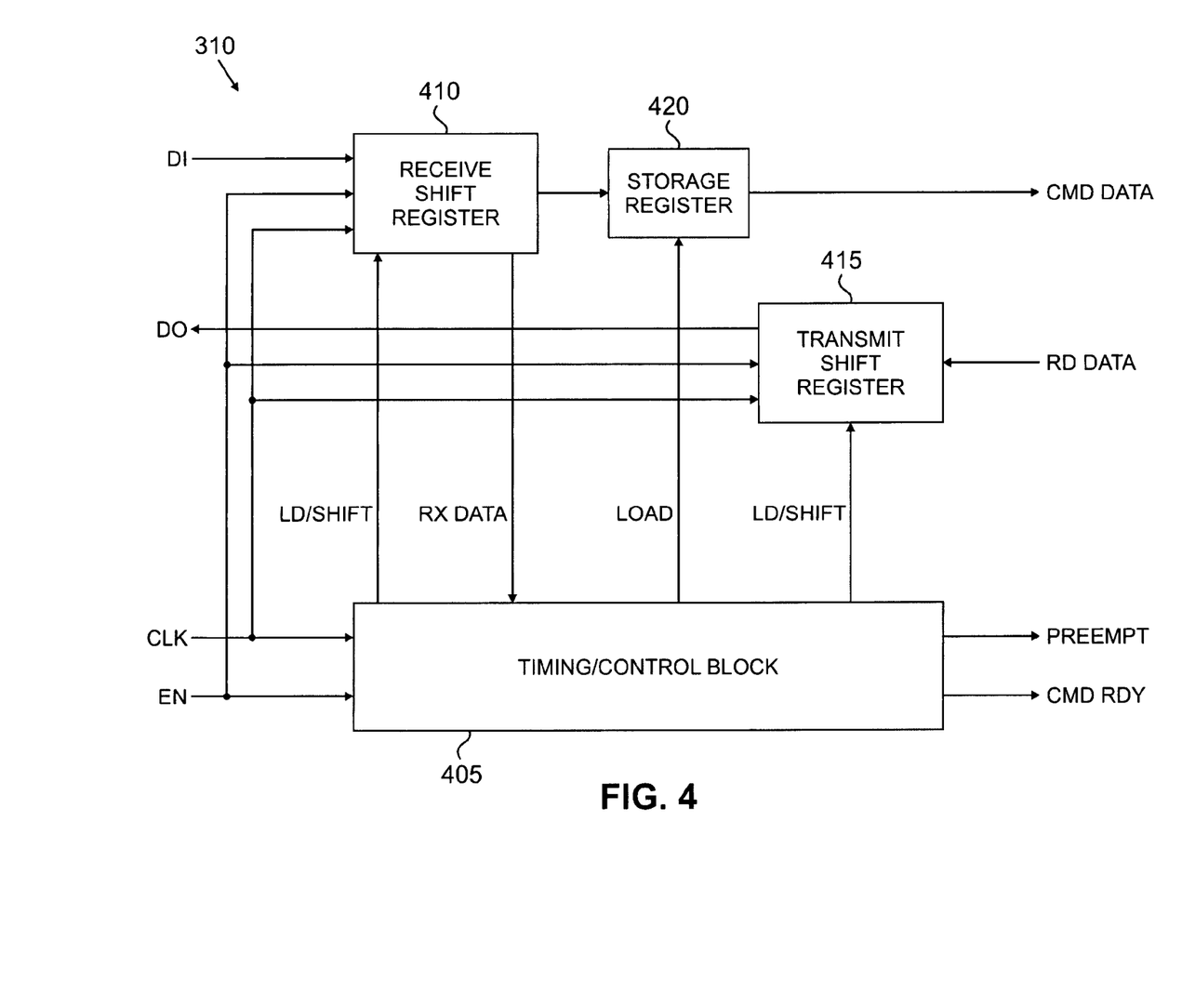
FIG. 4 is a block diagram illustrating details of one of the serial interface blocks of FIG. 3 according to one embodiment of the disclosure.

FIG. 4 is a block diagram illustrating details of one of the serial interface blocks 310 according to one embodiment of the disclosure. For this embodiment, serial interface block 310 comprises a timing/control block 405, a receive shift register 410, a transmit shift register 415 and a storage register 420.

Timing/control block 405 is responsible for coordinating serial access by loading and shifting shift registers 410 and 415 and storing received commands in storage register 420. Timing/control block 405 is operable to receive the CLK signal and the EN signal from a processing element 210 and to transmit the preempt signal and the CMD RDY signal to access arbiter 305. In addition, timing/control block 405 is operable to receive a Receive Data (RX DATA) signal from receive shift register 410 and to transmit a Load signal to storage register 420 and Load/Shift (LD/SHIFT) signals to receive shift register 410 and transmit shift register 415.

Receive shift register 410 is operable to receive the DI signal from the processing element 210, and transmit shift register 415 is operable to transmit the DO signal to the processing element 210. Receive shift register 410 is also operable to receive the LD/SHIFT signal from and to transmit the RX DATA signal to timing/control block 405, in addition to being operable to provide data to storage register 420. Storage register 420 is operable to receive the shifted contents of receive shift register 410 and the LOAD signal from timing/control block 405 and is operable to transmit the CMD DATA signal to access arbiter 305. Transmit shift register 415 is operable to receive the LD/SHIFT signal from timing/control block 405 and to receive the read access data (RD DATA) signal from access arbiter 305.

In operation, for one embodiment, receive shift register 410 provides the data received in DI signal to timing/control block 405 as the RX DATA signal. Based on the RX DATA signal, the CLK signal and the EN signal, timing/control block 405 generates the preempt signal for access arbiter 305. For a particular embodiment, timing/control block 405 generates a high-priority preempt signal when the RX DATA signal indicates that the associated command is a read command and a low-priority preempt signal when the RX DATA signal indicates that the associated command is a write command.

Figure 5:
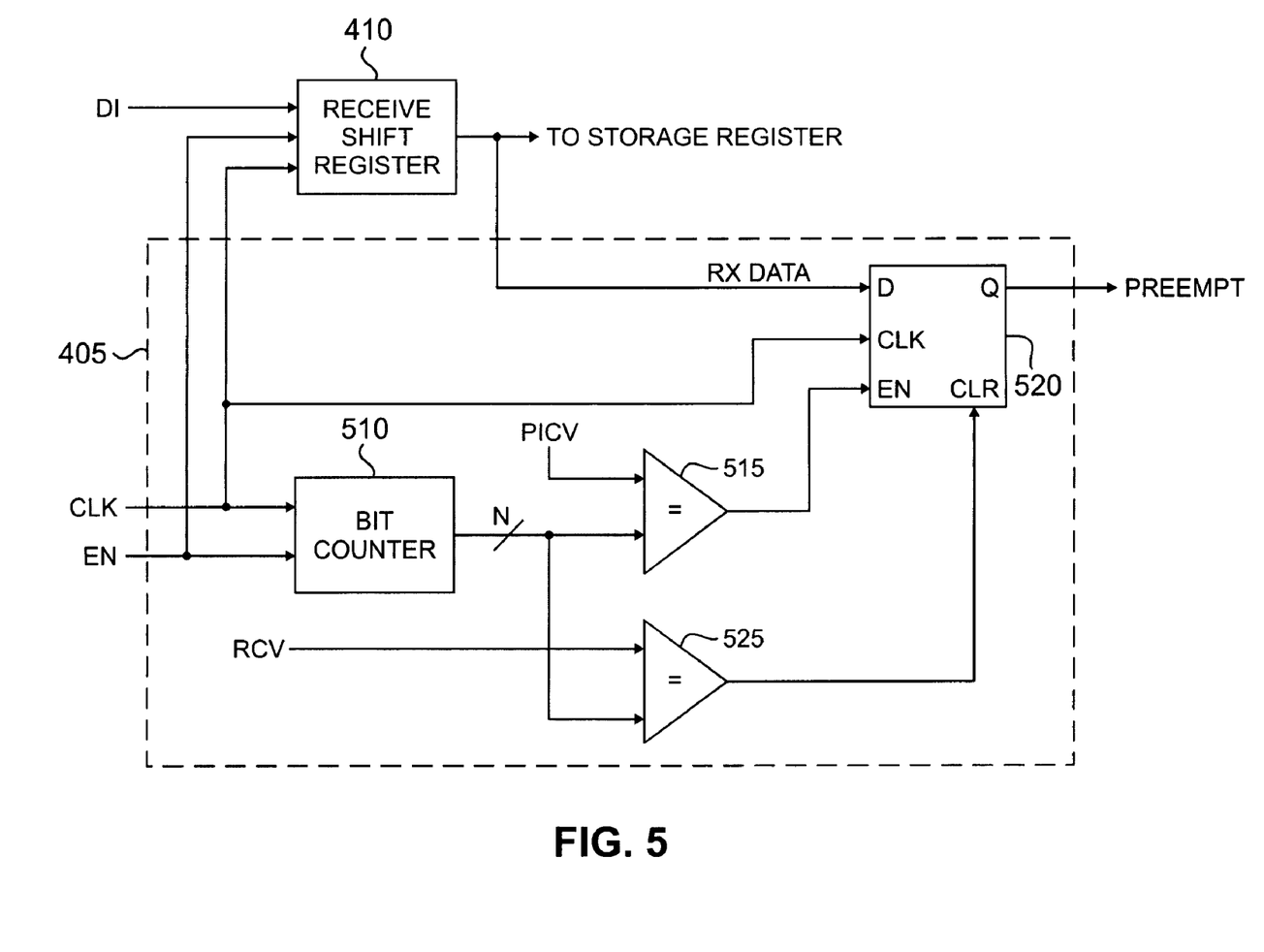
FIG. 5 is a block diagram illustrating details of the timing/control block of FIG. 4 according to one embodiment of the disclosure.

FIG. 5 is a block diagram illustrating details of timing/control block 405 according to one embodiment of the disclosure. For this embodiment, timing/control block 405 comprises a bit counter 510, a priority indicator comparator 515, a flip-flop 520 and a reset comparator 525.

Bit counter 510 is operable to generate a bit count by incrementing a counter for each bit received in DI signal and shifted out of receive shift register 410. Bit counter 510 is operable to count up to a predetermined reset value, as described below, and then to be reset to 0 and count up again. Thus, the output of bit counter 510, which comprises the bit count, may comprise any suitable number of bits, N, based on the maximum value of the bit count. The maximum bit count value may be based on the length of each command cycle. For the embodiment in which the commands are formatted as described above in connection with FIG. 3, the maximum bit count may comprise sixteen to include the command identifier and the address bits and N may comprise five. However, it will be understood that N may comprise any suitable number of bits based on any suitable maximum value for the bit count.

Priority indicator comparator 515 is operable to compare the bit count generated by bit counter 510 to a priority indicator comparison value (PICV) in order to determine that a predefined priority indicator in RX DATA signal has been reached, resulting in the generation of an enable signal. For the illustrated embodiment, the priority indicator comprises a single bit in the command that may be used to identify the command as high priority or low priority. For example, the priority indicator may be defined to be the command identifier bit described above that identifies the command as a read command or a write command. For the embodiment in which the command identifier comprises the first bit in the command, the priority indicator comparison value may comprise a 1. However, it will be understood that the priority indicator comparison value may comprise any suitable number based on the placement of the priority indicator. In addition, it will be understood that the priority indicator may comprise any suitable number of bits.

The flip-flop 520 is operable to be enabled by the enable signal generated by priority indicator comparator 515. When enabled, flip-flop 520 is operable to latch the current bit of RX DATA that is being tested in the receive shift register 410, which is designated as the priority indicator. Flip-flop 520 is then operable to generate the preempt signal based on the latched priority indicator. Thus, for a priority indicator of 1, the preempt signal comprises a 1. Similarly, for a priority indicator of 0, the preempt signal comprises a 0.

Reset comparator 525 is operable to compare the bit count to a reset comparison value (RCV), which may be generated internally or externally with respect to timing/control block 405, in order to determine that the priority indicator has been held by flip-flop 520 as the preempt signal for a sufficient amount of time. Thus, when reset comparator 525 determines that the reset comparison value equals the bit count, reset comparator 525 is operable to generate a clear signal. Flip-flop 520 is operable to clear the latched priority indicator when the clear signal is received from reset comparator 525.

For one particular embodiment, timing/control block 405 generates the preempt signal based on a priority indicator in the DI signal that corresponds to the first received bit. For the command format described above in connection with FIG. 3, this priority indicator comprises the command identifier bit that determines whether the command is a read command or a write command. However, it will be understood that timing/control block 405 may be otherwise implemented. For example, a priority indicator may comprise a bit other than the first bit and/or a delay may be inserted between the time that the priority indicator is received and the timing/control block 405 processes the priority indicator, in which case a priority indicator comparison value other than 1 may be provided by a register and/or a multiplexer may be used to select any appropriate bit or series of bits from receive shift register 410.

In operation, for one particular embodiment in which the priority indicator is the first bit and the priority indicator comparison value is 1, the DI, CLK and EN signals are received. When the bit counter enable signal EN goes low, the bit counter 510 begins to increment up from 0 with each rising edge of CLK signal and to output the bit count. At each rising edge of the CLK signal, the receive shift register 410 shifts in the serial bits of a command in the DI signal. When the bit counter 510 reaches its maximum value, the command in the receive shift register 410 is transferred to storage register 420 as the CMD DATA signal.

Based on the comparison of the bit counter output to the priority indicator comparison value of 1, priority indicator comparator 515 sends an enable signal to flip-flop 520, indicating that the first bit of the RX DATA signal is being received at flip-flop 520. Based on this enable signal, flip-flop 520 latches the value of the first bit of the RX DATA signal and provides this value as the preempt signal. Thus, using the above example of a serial word format, when the first bit of the RX DATA signal comprises a 0 indicating a write command, the preempt signal comprises a 0. Similarly, when the first bit of the RX DATA signal comprises a 1 indicating a read command, the preempt signal comprises a 1. So for the embodiment in which a read command is a high-priority command, the preempt signal comprising a 1 signifies a preempt request while the preempt signal comprising a 0 signifies no preempt request.

Bit counter 510 continues to increment with each rising clock edge until the reset comparison value is reached, at which point reset comparator 525 generates a clear signal for flip-flop 520. When flip-flop 520 receives the clear signal, the preempt signal is cleared until another enable signal is received from priority indicator comparator 515 based on another DI signal received for a subsequent cycle. In addition, bit counter 510 is cleared based on the enable signal EN going high after each command so that bit counter 510 may begin incrementing up from 0 again for the next cycle.

Figure 6:
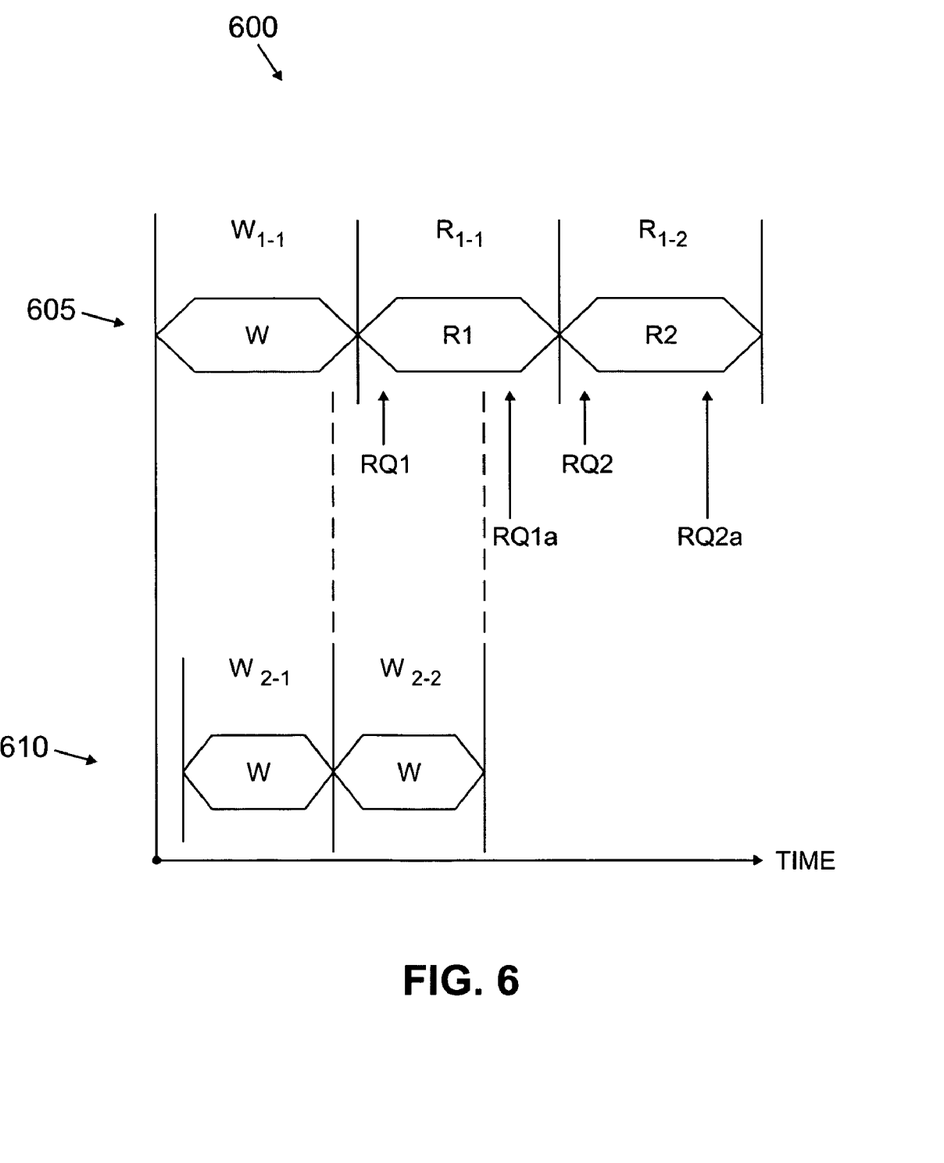
FIG. 6 illustrates an example of a two-cycle read access sequence for two ports accessing the multi-standard RFIC of FIG. 3 according to one embodiment of the disclosure.

FIG. 6 illustrates an example of a two-cycle read access sequence 600 for two processing elements accessing RFIC 205 according to one embodiment of the disclosure. For this particular example, a slower, higher priority processing element 605 transmits access requests as indicated in the upper line, while a faster, lower priority processing element 610 transmits access requests as indicated in the lower line. In the illustrated example, the first processing element 605 transmits a write request, followed by two read requests, and the second processing element 610 transmits two write requests.

In a typical RFIC without access arbitration as described in this disclosure, $W_{2-1}$ request is completed first (as each write request is placed in the command queue only after the command is completely received—command identifier, address and data). Thus, the $W_{1-1}$ request is completed second, when that request is completely received. After this, the faster, lower priority processing element 610 completes its second write request, $W_{2-2}$, before the slower, higher priority processing element 605 can have its first read request, $R_{1-1}$, put in the command queue. The read request, $R_{1-1}$, is put in the command queue at the point labeled RQ1a, which is after the command identifier and address have been received (as read requests need not provide any data along with the command identifier and address). Therefore, the order of the command queue for these requests is as follows: $W_{2-1}$, $W_{1-1}$, $W_{2-2}$, $R_{1-1}$ and $R_{1-2}$. Because of the latency caused by the three write commands, the first read request for the higher priority processing element 605 can result in an invalid read if the requested data is unavailable within the specified period of time during which a response is expected (denoted by RQ2a).

Using RFIC 205 with access arbiter 305 and serial interface blocks 310, however, results in a different order for the command queue. Because access arbiter 305 is able to put read requests in the command queue as soon as the preempt signal is received (which may correspond to the first bit of the request), the first read request for processing element 605, for example, is put in the command queue at the time labeled RQ1. As a result, this read request, $R_{1-1}$, is placed ahead of the second write request, $W_{2-2}$, of processing element 610. Therefore, the order of processing these requests is as follows: $W_{2-1}$, $W_{1-1}$, $R_{1-1}$, $W_{2-2}$ and $R_{1-2}$. Thus, the read requests are both provided enough time for processing, eliminating the invalid read that could otherwise result.

Figure 7:
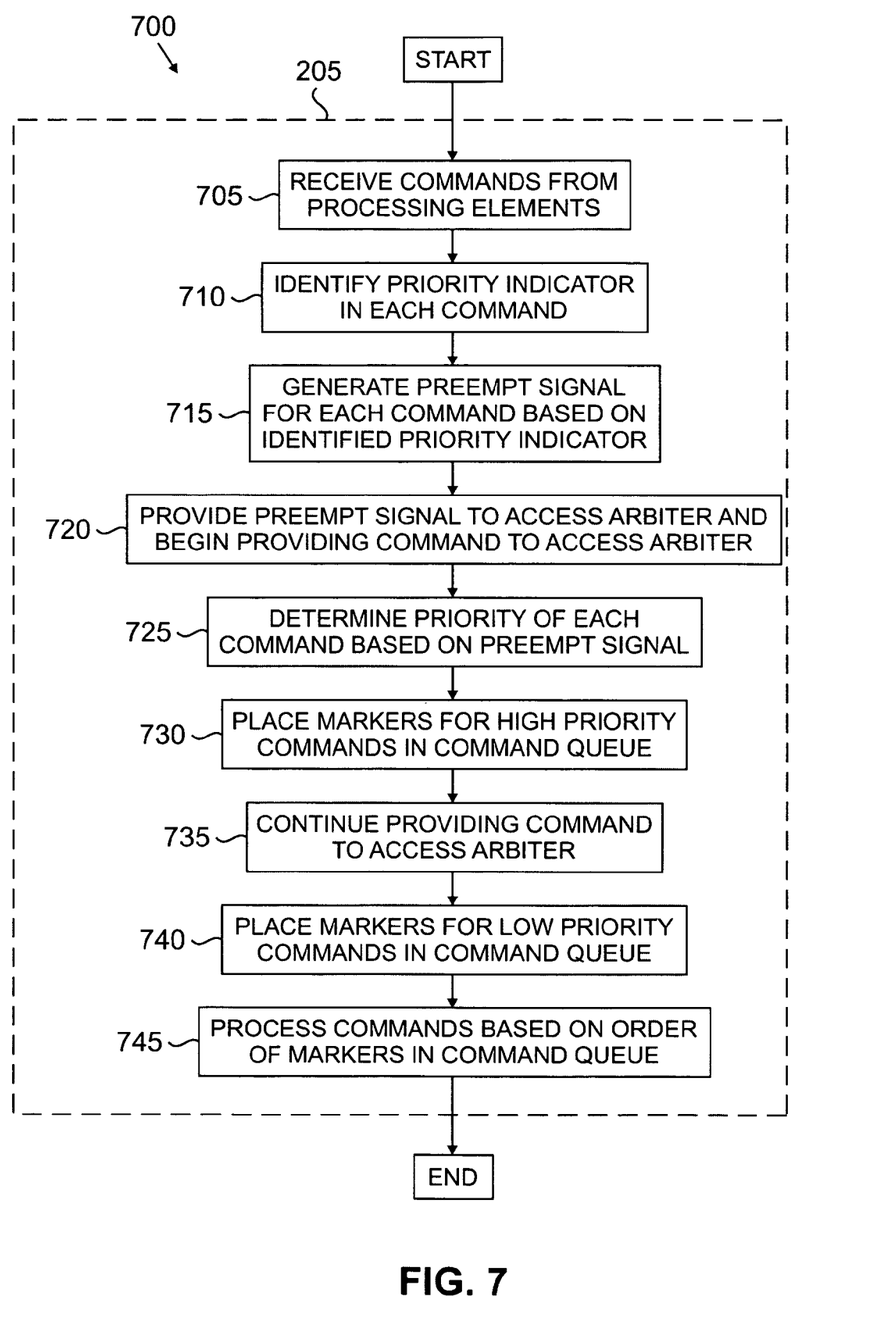
FIG. 7 is a flow diagram illustrating a method for providing access arbitration for the multi-standard RFIC of FIG. 3 according to one embodiment of the disclosure.

FIG. 7 is a flow diagram illustrating a method 700 for providing access arbitration for RFIC 205 according to one embodiment of the disclosure. Initially, RFIC 205 receives commands from one or more processing elements 210 (process step 705). For example, RFIC 205 may receive a command from one or more modems, with commands from each modem received at a corresponding serial interface block 310 in RFIC 205.

Each serial interface block 310 receiving a command identifies a predefined priority indicator in the command (process step 710). For example, for one embodiment, the priority indicator is defined as the first bit of a command and timing/control block 405 of each serial interface block 310 identifies the first bit received of the command as the priority indicator. The priority indicator may correspond to the command identifier bit of the command and, therefore, determine whether the command is a write or read command.

Each serial interface block 310 generates a preempt signal for the command based on the identified priority indicator (process step 715). For example, for one embodiment, the priority indicator comprises the read/write bit. For this embodiment, timing/control block 405 may generate the preempt signal based on the priority indicator by latching the read/write bit and providing the read/write bit as the preempt signal.

Serial interface block 310 provides the preempt signal to access arbiter 305 and also begins providing the command to access arbiter 305 (process step 720). Access arbiter 305 determines the priority of the command based on the preempt signal provided by the serial interface block 310 (process step 725). For example, for one embodiment, the preempt signal comprises the read/write bit. For this embodiment, access arbiter 305 may determine that the command is a high-priority command when the read/write bit identifies the command as a read command and may determine that the command is a low-priority command when the read/write bit identifies the command as a write command.

At this point, access arbiter 305 places markers for high-priority commands in the command queue (process step 730). Thus, continuing with the above example, access arbiter 305 places markers for the read commands in the command queue. For one embodiment, access arbiter 305 may also order the markers for the high-priority commands within the command queue based on a port priority signal received by access arbiter 305 from RFIC 205.

While access arbiter 305 is prioritizing the commands based on the preempt signals, serial interface block 310 continues providing the commands to access arbiter 305 (process step 735). Access arbiter 305 places markers for low-priority commands in the command queue in accordance with normal processing procedures (process step 740). Thus, for example, access arbiter 305 may place markers for the write commands in the command queue after the command identifier, address and data bits have been received from serial interface block 310. For one embodiment, access arbiter 305 may also order the markers for the low-priority commands within the command queue based on a port priority signal received by access arbiter 305 from RFIC 205.

Access arbiter 305 processes the commands based on the order of their markers in the command queue (process step 745). Thus, the high-priority commands are processed more quickly than the low-priority commands because the markers for the high-priority commands are placed in the command queue earlier than low-priority commands based on the preempt signals that are generated from the priority indicators, which for one embodiment comprise the first bit of data in each command. The markers for the low-priority commands, on the other hand, are placed in the command queue in accordance with normal processing (such as after the command is completely received for a write operation).

In this way, high-priority commands, such as read commands, may be placed in the command queue as soon as the commands begin to be received, instead of waiting for a large portion or all of the command to be received. Thus, RFIC 205 is able to respond to high-priority commands in a timely manner. For example, responses may be provided to read commands within the prescribed time period for a response, eliminating the possibility of an invalid read due to a read command being placed behind too many other commands in the command queue.

Although the present invention has been described with one embodiment, various changes and modifications may be suggested to one skilled in the art. It is intended that the present invention encompass such changes and modifications as fall within the scope of the appended claims.

What is claimed is:

1. A method for providing access arbitration for an integrated circuit in a wireless device, comprising:
   receiving a command from a processing element coupled to the integrated circuit;
   generating a preempt signal associated with the command, the preempt signal operable to identify a priority for the command as one of high and low,
      wherein generating the preempt signal comprises:
         identifying a predefined priority indicator in the command, the priority indicator comprising a read/write bit operable to identify the command as one of a read command and a write command, and
         latching the read/write bit; and
      providing the read/write bit as the preempt signal to an access arbiter for use in providing access arbitration for the command.

2. The method as set forth in claim 1, further comprising:
   determining the priority for the command in the access arbiter based on the preempt signal;
   when the priority for the command is determined to be high, placing a marker for the command in a command queue, the command queue comprising a plurality of markers, each marker corresponding to one of a plurality of commands; and
   processing the plurality of commands based on an order of the markers in the command queue.

3. The method as set forth in claim 2, determining the priority for the command based on the preempt signal comprising determining the priority for the command to be high when the read/write bit identifies the command as a read command and determining the priority for the command to be low when the read/write bit identifies the command as a write command.

4. A wireless device comprising an integrated circuit capable of providing access arbitration, the wireless device comprising:
   a plurality of processing elements, each processing element operable to generate a plurality of commands; and
   a radio frequency integrated circuit (RFIC) coupled to the processing elements, the RFIC operable to receive the commands from the processing elements, to determine a priority for each of the commands based on a priority indicator in the command, and to provide access arbitration based on the priority for each of the commands,
   wherein the RFIC is coupled to each processing element with a serial interface corresponding to the processing element, and
   wherein the RFIC comprising a plurality of serial interface blocks, each serial interface block operable to receive commands from one of the processing elements over the corresponding serial interface and to generate a preempt signal for each received command.

5. The wireless device as set forth in claim 4, each processing element comprising a modem operable to function using a different communication standard.

6. The wireless device as set forth in claim 4, each serial interface block operable to generate the preempt signal based on the priority indicator in the command.

7. The wireless device as set forth in claim 6, the RFIC further comprising an access arbiter coupled to the serial interface blocks, the access arbiter operable to determine the priority for each of the commands based on the corresponding preempt signal.

8. The wireless device as set forth in claim 7, the priority indicator comprising a read/write bit operable to identify the command as one of a read command and a write command.

9. The wireless device as set forth in claim 8, the access arbiter operable to determine the priority for each of the commands based on the corresponding preempt signal by determining the priority for the command to be high when the read/write bit identifies the command as a read command and by determining the priority for the command to be low when the read/write bit identifies the command as a write command.

10. A radio frequency integrated circuit (RFIC) capable of providing access arbitration in a wireless device, the RFIC comprising:
    a plurality of serial interface blocks, each serial interface block operable to receive commands from a corresponding processing element coupled to the RFIC and to generate a preempt signal for each command; and an access arbiter coupled to the serial interface blocks, the access arbiter operable to receive the commands and the corresponding preempt signals from the serial interface blocks, to determine a priority for each of the commands based on the corresponding preempt signal, and to provide access arbitration for the processing elements based on the priority for each of the commands.

11. The RFIC as set forth in 10, each serial interface block operable to generate the preempt signal based on a priority indicator in the command.

12. The RFIC as set forth in claim 11, the priority indicator comprising a read/write bit operable to identify the command as one of a read command and a write command.

13. The RFIC as set forth in claim 12, the access arbiter operable to determine the priority for each of the commands based on the corresponding preempt signal by determining the priority for the command to be high when the read/write bit identifies the command as a read command and by determining the priority for the command to be low when the read/write bit identifies the command as a write command.

14. The RFIC as set forth in claim 12, each serial interface block comprising a timing/control block operable to generate the preempt signal.

15. The RFIC as set forth in claim 14, the timing/control block comprising:

a bit counter operable to generate a bit count based on a number of bits in the command received at the timing/control block;

a priority indicator comparator coupled to the bit counter, the priority indicator comparator operable to identify the read/write bit based on the bit count and to generate a flip-flop enable signal when the read/write bit is identified; and a flip-flop coupled to the priority indicator comparator, the flip-flop operable to latch the read/write bit based on the flip-flop enable signal.

16. The RFIC as set forth in claim 15, the priority indicator comparator operable to identify the priority indicator based on the bit count by comparing the bit count to a priority indicator comparison value and operable to generate the flip-flop enable signal when the bit count equals the priority indicator comparison value.

17. The RFIC as set forth in claim 16, the priority indicator comparison value comprising a 1.

18. The RFIC as set forth in claim 15, the flip-flop further operable to generate the preempt signal by providing the latched read/write bit as the preempt signal.

19. The RFIC as set forth in claim 15, the timing/control block further comprising a reset comparator coupled to the bit counter and to the flip-flop, the reset comparator operable to reset the flip-flop between consecutively received commands.

20. The RFIC as set forth in claim 19, the reset comparator operable to reset the flip-flop by comparing the bit count to a reset comparison value and generating a clear signal for the flip-flop when the bit count equals the reset comparison value.

* * * * *